Nov. 24, 1953  E. S. WRIGHT  2,660,506
STORAGE FILE FOR PROGRAM TAPES
Filed Feb. 24, 1950
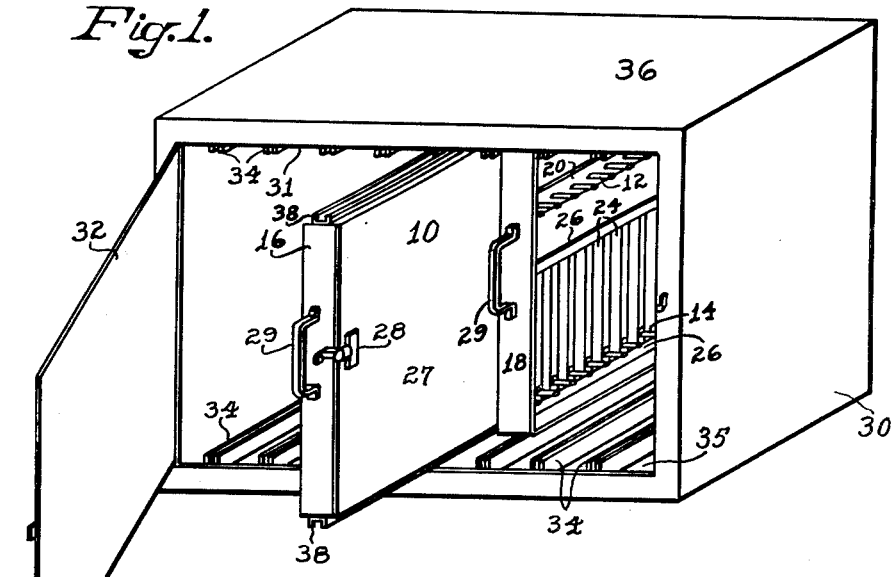
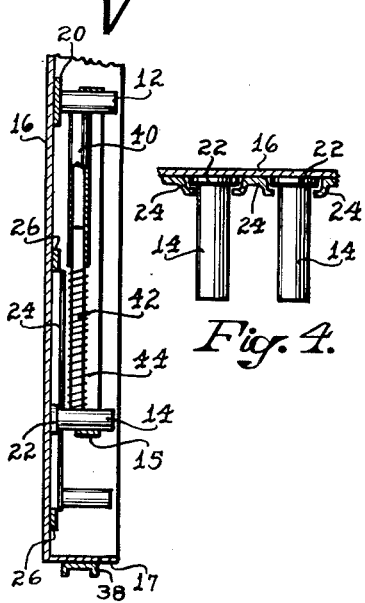
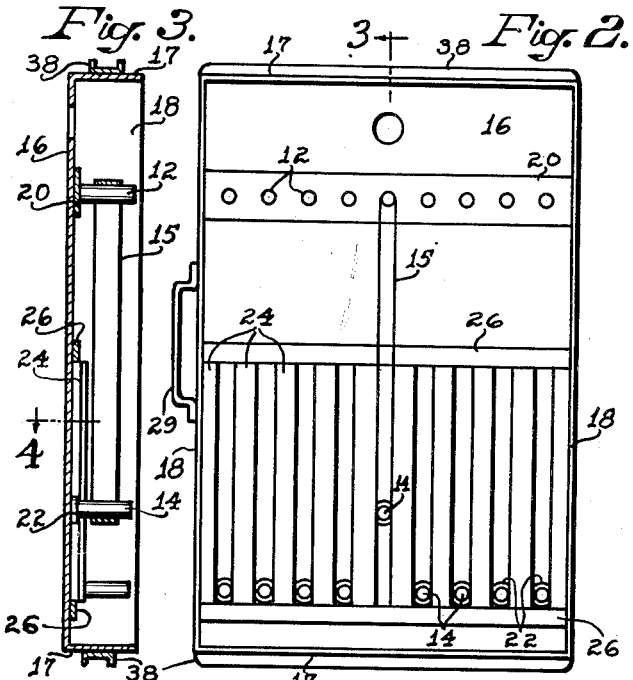
Inventor
E. Stanley Wright
By Clayton L. Jenks
Attorney Patented Nov. 24, 1953

2,660,506

UNITED STATES PATENT OFFICE 2,660,506

STORAGE FILE FOR PROGRAM TAPES

Elvin Stanley Wright, Shrewsbury, Mass.

Application February 24, 1950, Serial No. 146,016

2 Claims. (Cl. 312—306)

This invention relates to a storage file for program tapes which govern a business machine.

One type of business machine in standard use comprises an electric typewriter which is operated automatically by a card reading unit in accordance with the punch markings on a series of cards. If, for example, invoices are to be typed for billing various customers, a special card is initially punched for each customer, wherein the locations of the holes give various data, such as the name and address of the customer and accounting classification information. Another set of cards, known as product cards, contains, for example, the stock location classification, parts numbers, descriptions, and prices of the items. When a given card is run through the electric typewriting machine, the data on each card is automatically typed on the document being prepared, such as an invoice, in accordance with the punch markings. The operator of the machine also has facilities for typing further data that has not been presented by the punched cards. It is necessary that the various data, such as the customer's address, the date and information selected from the product card, be typed in correct locations on the invoice, and this requires shifting the paper relative to the keyboard for the purpose. A program tape, usually made of an endless strip of paper about one inch wide, carries punch markings that control the location of the typed paper during the electric typing operations so that the data will be correctly placed. The holes in the program tape govern certain electric contacts which control the operations of the typewriter according to the locations of the holes. Each program tape is, therefore, initially set up in accordance with the operation that is to be performed. One tape is for making out invoices, and another is for accounting or calculating operations, these tapes being prepared according to the nature of the paper to be typed. A tape for controlling the operations of preparing invoices is, therefore, the same for all of the customers and whatever may be the nature of the data to be typed, since this tape serves merely to position the invoice paper correctly so that the electric typewriter may automatically place the desired data in its correct location.

These tapes are pre-punched in multiple duplicate sets, so that if one tape becomes destroyed, another is available. In order that the tapes may feed through the machine properly, they should not be creased or folded and should be carefully handled and preserved. These tapes should be so filed or stored that they are readily available and without confusion in their selection, so that an invoice tape, for example, would not be used if the required operation was for writing up an inventory or making desired accounting calculations. It is also convenient to have the tapes filed with related parts of the machine. For example, an invoice tape will always be used correctly with the electrical control panel for typing invoices. Hence, it is desirable that the tapes be filed in a multiple part cabinet which carries the various interchangeable working parts of the business machine.

The primary object of this invention is to satisfy these requirements and to provide a storage file for supporting the set of program tapes required for these card operated electric typewriter machines and which will hold a set of single or duplicate tapes in proper condition for re-use as needed and particularly in a distended and a smooth, non-creased condition, and yet which provides for ready removal of each desired tape without interfering with any other stored tape.

A further object is to provide a multiple part cabinet having an outer protective casing within which is removably mounted a tape file box in association with other file sections for storing similar tapes or related operating parts of the business machine. Further objects will be apparent in the following disclosure.

Referring to the drawings, which illustrate two embodiments of the invention:

Fig. 1 is an isometric view of a complete cabinet having two tape file boxes removably mounted therein;

Fig. 2 is a vertical elevation of a file box with the cover removed and showing the locations and arrangements of the sets of pegs on which the program tapes are mounted;

Fig. 3 is a vertical section on the line 3—3 of Fig. 2;

Fig. 4 is a fragmentary section on the line 4—4 of Fig. 3; and

Fig. 5 is a vertical section of a modification having a spring to hold the tape distended.

In accordance with this invention, the program tape file box or section, indicated generally by the numeral 10 in Fig. 1, comprises a wall member having two spaced sets of cylindrical pegs 12 and 14 so mounted thereon that the endless program tape 15 may be properly supported. The pegs 12 of one set are fixed and the pegs 14 of the other set are movably mounted so as to hold the tape suitably distended therebetween. Each peg is comparatively large in diameter, such as about a half inch or more, so that the paper of the program tape will not be creased thereby. These supporting pegs may be made of suitable material, and preferably of metal, and each is, for example, two inches long or of sufficient size for holding a desired number of duplicate endless program tapes. Various construction details may be employed for supporting the tapes in a smooth and distended condition wherein one end of the tape loop is carried on a stationary peg and the other is mounted on a peg that is urged away from the stationary peg, as by the force of gravity or by a spring, to maintain the tape distended.

In the embodiment illustrated in Figs. 2, 3 and 4, the support for the pegs may comprise a container having a back vertical wall 16 and peripheral top and bottom walls 17 and side walls 18 made of suitable sheet metal, which are welded together to form a rectangular open sided box. An upper row of stationary iron or steel pegs 12 may be suitably welded to a plate 20 and the latter secured on the back wall 16, as by spot welding. These are located well below the top wall to provide for ready access to and placement and removal of the tapes. The lower metal pegs 14 are vertically movable under the influence of gravity. Each of these pegs may have an enlarged, laterally projecting foot, such as a circular washer or slide member 22 welded to the peg, and the slide member or foot is slidably located within two opposed U-shaped slide ways formed by angle iron plates providing two spaced and projecting flanges, such as the flanges of two opposed U-shaped guide plates 24 suitably secured as by welding to the back wall 16 of the file box. The U-shaped guide plates are suitably spaced in parallelism and provide a groove or track within which the pegs 14 may slide freely in a vertical direction but will be held by their integral circular flanges or feet 22 and prevented from tipping laterally to a material extent.

Hence, as shown in Fig. 2, a paper tape 15 may be mounted on the upper peg 12 and then looped over the lower peg 14 that has been raised to the correct position for carrying the loop. The slideways formed by the guide plates 24 may extend far enough up the box, such as half way, so as to provide for all of the standard lengths of tape that might be employed in the business machine. Whatever may be the length of the tape, the lower peg 14 has such weight that it will hold its associated tape automatically distended. Two cross bars 26 extend across the ends of the channels provided by the U-shaped members 24, so that after the pegs 14 have been assembled, they cannot be removed. The file box may be left open as shown in Fig. 3, or it may have a hinged or other type of cover 27 suitably secured thereto, as indicated in Fig. 1, and provided with a suitable lock 28 to hold it in place.

It will be appreciated that insofar as described this file box may be suitably stored, such as by hanging the file box on the wall by means of the handle 29 engaging a wall peg. However, it is desirable that the file box 10 be removably mounted in a cabinet that is especially adapted for the purpose. As shown primarily in Fig. 1, a cabinet for a set of file boxes may comprise a sheet metal container 30 formed as a parallelepipedon having an opening 31 at the front which may be suitably closed by a hinged door 32 or other desired closure. The cabinet is so constructed that the file boxes may be mounted side by side with the tapes suspended vertically. In the preferred arrangement, the cabinet is provided with sets of channel irons forming upper and lower runways or slide rails 34 secured in vertically opposed relationship on the inside portions of the bottom 35 and top 36 of the cabinet. Each pair of upper and lower rails 34 slidably supports U-shaped slide members 38 secured on the bottom and top walls 17 of the file box. If desired, the U-member may be on the cabinet wall and the interfitting rail on the box. The slide members 34 of the cabinet may comprise single bars of iron or, as illustrated, two parallel strips of thin sheet metal suitably welded in place. These strips are so spaced relative to the distance between the sides of the U-members 38 on the box that the box will slide readily. The rails 34 project far enough into the opening 31 of the cabinet and the vertical distances between the rails 34 at the top and bottom of the cabinet are such that the file box will readily slide into the cabinet and be positioned by the opposed sets of slide rails. The handle 29 on the outer end or side of the file box serves for moving it into and out of the cabinet.

By this construction, it is feasible to mount the program tape file box in the cabinet in association with other tape file boxes or boxes of the interchangeable parts of the business machine that is to be governed in accordance with the particular tape that is chosen for use. That is, some of the file boxes 10 may carry the electric control panels that are to be interchangeably used on the machine in association with the chosen program tape, so that all of the required parts of the machine may be stored and be readily available for quick interchange.

If it is desired to file the program tapes in horizontally positioned drawers or boxes, the tapes may be held distended by means of springs which urge the movable pegs away from the stationary ones. Springs may likewise be used in a vertical construction of the general type shown in Figs. 2 and 3. As shown in Fig. 5, such a vertically arranged construction may be substantially the same as that illustrated in Fig. 3 wherein the stationary pegs 12 are mounted on the back wall 16 of the box and the movable pegs 14 ride in slide ways between the flanged members 24. The movable pegs 14 are urged away from the stationary pegs by means of a construction comprising a tube 40 secured to one of the pegs, such as the stationary peg 12, and a rod 42 secured to the other opposed peg and arranged to slidably telescope within the tube. A coiled compression spring 44 surrounds the rod 42, and the two ends of the compression spring respectively engage the end of the tube 40 and the peg 14 to which the rod 42 is fastened. The characteristics of the spring and its length are such that the peg 14 may slide to a desired extent within its guide way and be urged always towards the far end of the guide way so that it will hold the paper strip 15 always distended. Hence, when the container is laid down on its back 16 or if the container is normally filed in that horizontal position, the spring 44 will insure that the program tape cannot become loose on its peg mounting. The spring, therefore, aids gravity in urging the pegs apart when the peg supporting wall is vertical, and it serves as the sole moving force when the supporting wall is horizontal. The operation of each of these constructions is fully apparent with the above disclosure. It is also evident that other arrangements involving the use of gravity or of a resilient medium for urging the movable peg away from the stationary peg may be employed. Various constructional modifications may be made without departing from the objects of this invention and within the scope of the appended claims.

I claim:

1. In a storage file for endless program tapes, a file box having a vertical rear wall and narrow side, top and bottom walls forming an open sided shallow container, an upper row of horizontal parallel pegs fixedly mounted on the rear wall and projecting therefrom not more than the width of the side walls which are widely spaced from the top wall to permit ready manual access for hanging a tape thereon, a set of vertical parallel plates mounted on the rear wall, flange means projecting from each plate which form slideways beneath and extending only part way and upwardly towards the fixed pegs, a horizontal movable peg arranged vertically beneath, parallel to and of substantially the same length as each fixed peg which has a laterally projecting foot slidably mounted in the associated slideway and arranged for movement downwardly under the influence of gravity, the vertically associated fixed and movable pegs being cylindrical and having a substantial diameter and each lower peg having such a weight that a plurality of similar program tapes may be held distended between the pegs under a low pressure without creasing or rupture thereof, and means for preventing accidental removal of the lower pegs from their slideways.

2. In a storage file for endless program tapes, a file box having a rear wall and narrow opposed side and end walls forming an open sided shallow container, a row of parallel pegs fixedly mounted on the rear wall and projecting therefrom not more than the width of the side walls which are widely spaced from one end wall to permit ready manual access for applying a tape to the pegs, a set of parallel angle iron plates mounted on the rear wall which have pairs of flanges forming parallel slideways opposed to and extending only part way towards the fixed pegs, a movable peg arranged parallel to and of substantially the same length as each fixed peg which has a laterally projecting foot slidably mounted in the associated slideway and arranged for movement towards and from an opposed fixed peg, the opposed fixed and movable pegs being cylindrical and having a substantial diameter, means for preventing accidental removal of the movable pegs from their slide ways and resilient means for urging each movable peg away from the opposed associated fixed peg so that a plurality of similar program tapes may be held distended between the pegs under a low pressure without creasing or rupture thereof.

ELVIN STANLEY WRIGHT.

References Cited in the file of this patent

UNITED STATES PATENTS

| Number | Name | Date |
|---|---|---|
| 514,050 | Wesely | Feb. 6, 1894 |
| 850,649 | Huntington | Apr. 16, 1907 |
| 1,146,739 | Shannon | July 13, 1915 |
| 1,414,505 | Ede | May 2, 1922 |
| 1,485,646 | Traumuller et al. | Mar. 4, 1924 |
| 1,882,890 | Porter | Oct. 18, 1932 |

FOREIGN PATENTS

| Number | Country | Date |
|---|---|---|
| 247,002 | Great Britain | Feb. 11, 1926 |
| 550,070 | Great Britain | Dec. 22, 1942 |